Sept. 29, 1925. Re. 16,178

H. D. RANDALL

FRICTIONAL CONTACT WINDOW GUIDE

Original Filed June 23, 1924

Inventor
Howard D. Randall

By Stanley M. Bowman
Attorneys

Reissued Sept. 29, 1925.

Re. 16,178

UNITED STATES PATENT OFFICE.

HOWARD D. RANDALL, OF CINCINNATI, OHIO.

FRICTIONAL CONTACT WINDOW GUIDE.

Original No. 1,530,695, dated March 24, 1925, Serial No. 721,641, filed June 23, 1924. Application for reissue filed May 23, 1925. Serial No. 32,518.

*To all whom it may concern:*

Be it known that I, HOWARD D. RANDALL, a citizen of the United States, residing at Cincinnati, in the county of Hamilton and State of Ohio, have invented new and useful Improvements in a Frictional Contact Window Guide, of which the following is a specification.

This invention is concerned with a yielding guide, channel or run in which glass window panes may be retained or reciprocated and is particularly adapted to the doors and windows of closed motor cars, such as sedan automobiles and similar uses, and the form of the structure may be modified to adapt it to various other uses.

This invention has for one of its objects the provision of a channel device so formed of metallic and flexible covering that the points of engagement with the glass will be sufficiently stiff and firm and yet the other parts of the device and particularly the base portion will be sufficiently flexbile to insure the device fitting properly within the channel or way, and that there will be a certain independence of movement of the base portion and the portions engaging the glass, such that the engaging portions will not interfere with the flexibility of the other portions, and vice versa.

This invention has for another object the providing of engaging points with the glass that have a positive spring contact therewith and in providing a structure of the class described that may be economically and expeditiously produced and applied.

These and other objects are attained by the means described herein, and disclosed in the accompanying drawings, in which.

Figure 1:
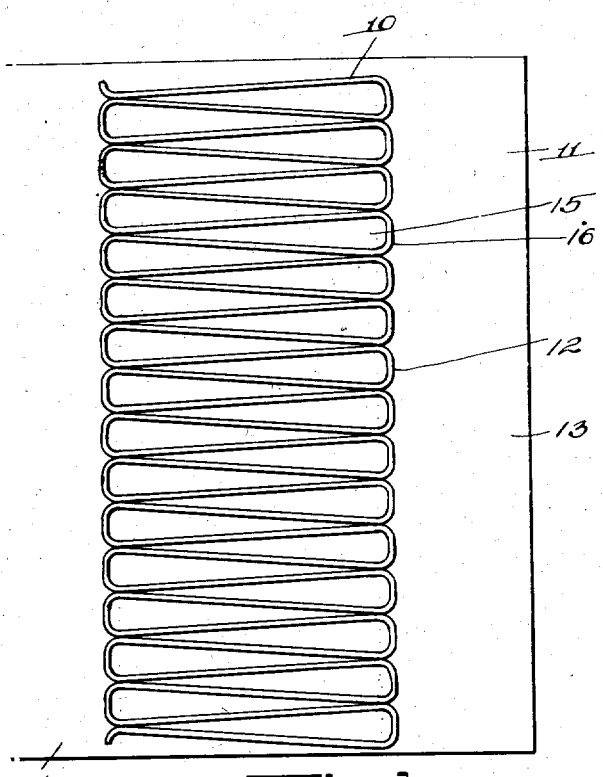
Fig. 1 is a plan view showing the elements of a device embodying my invention in position ready for mounting, one upon the other.
Figure 4:
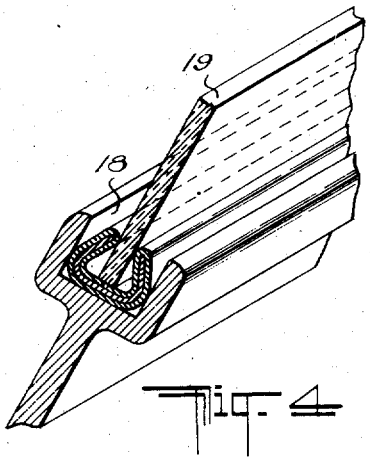
Fig. 4 is a fragmental perspective view, part in section, showing a structure as disclosed in Fig. 3 in position in a door, and operative upon a fragment of a plate glass.

Briefly my structure comprises a wire mat or core 12, which is termed the metal member, for which a flexible covering 11, hereafter called the non-metallic member, is provided. The core 12 is produced preferably from wire, having desired spring characteristics, and is preferably bent backwardly and forwardly in the manner disclosed in Fig. 1 for providing a substantially flat rectangular wire mat. The wire 10 may be of any suitable cross section and the particular configuration of the various loops developed along the lateral edges of the wire mat may be varied and modified to meet various conditions, a main feature being that the base and sides constituting the body portion of the mat, when the mat or core 12 is bent into channel shape, are of such reticulated or open character that, while the engaging edges or peripheries of mat 12 will hold the glass firmly with a spring action, the body portion of the mat or core will retain considerable flexibility and independence of movement without interfering with the holding capacity of those engaging edges.

The flexible covering 11, or non-metallic member, is preferably provided on its inner face with an adhesive so that when the wire mat 12 is placed upon the flexible covering 11, and the lateral ends 13 and 14 of the flexible material are bent over the wire mat, the adhesive will serve to bind the opposed portions of the flexible material, where such sections contact through the openings 15 formed interiorly of the loops 16 developed along the lateral edges of the wire mat 12, and the open character of the base and sides of the metal member will enable the device to retain some of the plasticity of the covering which is desirable in this character of device.

Figure 2:
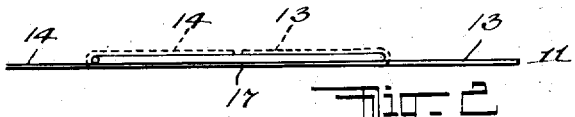
Fig. 2 is an end view of the parts shown in Fig. 1.
Figure 3:
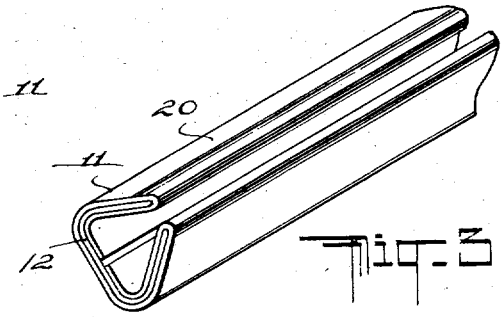
Fig. 3 is a perspective view of the parts shown in Figs. 1 and 2, after same has been formed into a channel preparatory to mounting same upon a vehicle door or frame.
Figure 5:
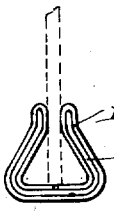
Fig. 5 is an end view of a modified form of device embodying my invention.

In Fig. 2, the ends 13 and 14 are shown in dotted lines in their fixed positions relative to the underlying position 17 of the covering material. The structure, after fixation of the ends 13 and 14, is then bent to the desired form, for example to the channel forms shown in Figs. 3 and 5, whereupon the channel may be inserted in the run or way 18 that forms part of a vehicle door or the like, and in which the plate glass window 19 or the like is received. It will be readily evident that the flexible material 11 may be reinforced by capping the looped ends 12 of the wire mat prior to the turning inward of the lateral edges 13 and 14 of the flexible material 11. It will be readily evident that the flat structure disclosed in Fig. 2, after the ends 13 and 14 are affixed, may be developed into various flexible forms other than the channel 20, wherefore I do not restrict my invention to the specific form into which such flat structure might be developed.

Although the invention as disclosed herein comprises spring wire having resilient qualities, it will be readily evident that under some circumstances such qualities might be undesirable, wherefore it is not intended to restrict the invention to a structure wherein the wire is resilient or yielding. In applying the glass to the channel, it is apparent that the edges of the channel will be slightly unbent by the sliding action of the glass, a small part at a time.

Having described the invention, I claim as follows:

1. In a device of the character described the combination of a metallic member having substantially continuous outer edges and a body portion of open character with a covering member of a flexible character, said members being bent to form a channel, and a glass member adapted to fit within said channel, the outer edges of said metallic member holding said glass member by a spring action while the body portion of said metallic member permits the retention by the covering member of its pliability to enable it to adapt itself to different conditions of use.

2. As a new article of manufacture a channel comprising a flexible covering, and a resilient mat contained within the covering and comprising a continuous spring wire extending in alternate directions, and having its lateral edges disposed at angles to the intermediate portions thereof for providing the side walls of the channel.

3. A channel structure of U-shaped cross section comprising a resilient wire mat and a flexible covering for the mat, the mat comprising a serpentine wire looped along its lateral edges and having its lateral edges turned relative to the intermediate or base portion thereof, whereby the lateral portions of the wire mat form part of the arms of the channel and retain the lateral edges of the flexible covering at an angle to the center portion of the covering, the said lateral edges of the wire mat and flexible covering providing a way between them through which way a sliding member may be moved, the arms of the channel yieldingly resisting movement of such sliding member.

4. A channel structure of U-shape cross section comprising a resilient wire mat and a covering for the mat, the mat and covering being relatively fixed, the mat having its lateral edges turned at an angle and overhanging the intermediate portion or base of the structure for providing a way wider at its bottom than at its top and for yieldingly resisting movement of a sliding member through the way.

5. In a channel device, the combination of a reticulated metal member with a non-metallic member, the sides of the metal member being bent to form engaging spring arms having a channel formed by said arms, a slidable glass member fitting within said channel and engaged by said spring arms, the reticulated character of the spring arms permitting the glass member to be inserted by springing back the arms, part at a time, until the entire glass is inserted therein.

HOWARD D. RANDALL.